United States Patent
de Ruijter

(10) Patent No.: US 12,267,778 B2
(45) Date of Patent: Apr. 1, 2025

(54) PERFORMING DUTY CYCLED LISTENING IN A RECEIVER

(71) Applicant: Silicon Laboratories Inc., Austin, TX (US)

(72) Inventor: Hendricus de Ruijter, Roseville, CA (US)

(73) Assignee: Silicon Laboratories Inc., Austin, TX (US)

( * ) Notice: Subject to any disclaimer, the term of this patent is extended or adjusted under 35 U.S.C. 154(b) by 348 days.

(21) Appl. No.: 17/749,207

(22) Filed: May 20, 2022

(65) Prior Publication Data
US 2023/0379822 A1   Nov. 23, 2023

(51) Int. Cl.
*H04W 52/02*   (2009.01)

(52) U.S. Cl.
CPC .............. *H04W 52/0229* (2013.01)

(58) Field of Classification Search
CPC .................. H04W 52/0229; Y02D 30/70
See application file for complete search history.

(56) References Cited

U.S. PATENT DOCUMENTS

2019/0103950 A1* 4/2019 Liu ................... H04W 8/24
2022/0394671 A1* 12/2022 Zhang ................ H04B 7/0617

OTHER PUBLICATIONS

U.S. Appl. No. 17/547,396, filed Dec. 10, 2021, entitled "System, Method and Apparatus to Reduce Error in Unused Tones in Partial Bandwidth Wireless Transmission System," by Sriram Mudulodu, et al.
Silicon Labs, "EZR32LG Wireless MCU Data Short", Rev. 1, pp. 1-2.
Silicon Labs, "UG103.11: Thread Fundamentals", Rev. 1.2, 2022, pp. 1-25.

* cited by examiner

*Primary Examiner* — Marcos L Torres
(74) *Attorney, Agent, or Firm* — Trop, Pruner & Hu, P.C.

(57) ABSTRACT

In one aspect, a method includes: enabling, via a controller of a network device, a receiver of the network device for a plurality of receive fragments during a receive duration; analyzing a signal fragment received during at least one of the plurality of receive fragments to identify possible presence of a wake-up frame sent by a coordinator device; and in response to the identification of the possible presence of the wake-up frame, enabling the receiver to receive and detect another wake-up frame.

9 Claims, 7 Drawing Sheets

PERFORMING DUTY CYCLED LISTENING IN A RECEIVER

BACKGROUND

Coordinated Sampled Listing (CSL), as specified in the IEEE 802.15.4-2020 standard, can be used to reduce current consumption in a receiver of an End Device (ED) by transmission of a wake-up sequence that is sent by a non-power-constrained Coordinator Device (CD). This allows power-constrained EDs to duty cycle their receiver between an active receive state and an idle state to find a wake-up frame from the wake-up sequence, thus prolonging the battery lifetime of the EDs.

In some use cases, for example, in Unsynchronized CSL, the ED receiver needs to listen for quite a while since the ED does not have information as to when the CD starts to transmit wake-up frames. Typical solutions rely on detection of a preamble of a wake-up frame, which can incur significant receiver on times and processing in performing detection to find the wake-up frames.

SUMMARY OF THE INVENTION

In one aspect, a method includes: enabling, via a controller of a network device, a receiver of the network device for a plurality of receive fragments during a receive duration; analyzing a signal fragment received during at least one of the plurality of receive fragments to identify possible presence of a wake-up frame sent by a coordinator device; and in response to the identification of the possible presence of the wake-up frame, enabling the receiver to receive and detect another wake-up frame.

In an example, the method further comprises causing the receiver to enter a first idle state for a first idle duration between a first receive fragment and a second receive fragment of the plurality of receive fragments. A duration of the first receive fragment, the second receive fragment and the first idle duration may substantially equal a duration of the wake-up frame. Analyzing the signal fragment may include analyzing, in a signal identifier circuit of the network device, at least one of received energy during the signal fragment, modulation characteristics associated with the wake-up frame, or spreading characteristics associated with the wake-up frame.

In an example, the method further comprises in response to not identifying the possible presence of the wake-up frame during the plurality of receive fragments, causing the receiver to enter a second idle state for a second idle duration, the second idle duration substantially greater than the first idle duration. Enabling the receiver to receive and detect the another wake-up frame may include: causing the receiver to enter into a third idle state for a third idle duration; and after the third idle duration, enabling the receiver to receive and detect the another wake-up frame.

In an example, enabling the receiver to receive and detect the another wake-up frame comprises maintaining the receiver in an active state in response to identifying the possible presence of the wake-up frame. The method may further comprise in response to detecting the another wake-up frame, sending from the network device to the coordinator device a data request frame. Also, the method further may include accessing a storage of the network device to obtain configuration information and in response to the configuration information, enabling the receiver for a given number of the plurality of receive fragments and for a given duration of the receive duration. The receive duration may be a duration of the wake-up frame and a macCSL period. In an example, the method further comprises storing the signal fragment in a buffer of the network device and accessing the signal fragment from the buffer to post process the signal fragment to identify the possible presence of the wake-up frame.

In another aspect, an apparatus includes: a receiver to receive and process radio frequency (RF) signals to obtain downconverted signals; a digitizer coupled to the receiver to digitize the downconverted signals to digital signals; and a controller to enable the receiver for a plurality of receive fragments during a listening period. The controller may be configured to cause the receiver to: enter into a first idle state for a first idle duration between each of the plurality of receive fragments; and enter into a second idle state for a second idle duration after the listening period, the second idle duration longer than the first idle duration.

In an example, the controller is to cause the receiver to enter into a third idle state after detection of a portion of a wake-up frame during one of the plurality of fragments, the third idle state for a third idle duration. The apparatus may further comprise a memory to store configuration information comprising a first value of the first idle duration, where the controller is to obtain the first value from the memory and enable the receiver to enter the first idle state for the first idle duration according to the first value. The apparatus also may include a signal identifier circuit coupled to the digitizer to receive the digital signals and to identify a possible wake-up frame in response to the digital signals. The signal identifier circuit may be configured to identify the possible wake-up frame according to one of received energy during the signal fragment, modulation characteristics associated with the wake-up frame, or spreading characteristics associated with the wake-up frame.

In yet another aspect, a system includes a network device. The network device may include a transceiver comprising receiver circuitry to receive and process first RF signals to obtain downconverted signals. When the network device is in a low power idle state, the receiver circuity may enter into an active state for a plurality of receive fragments of a receive duration, the receive duration formed of a duration of two wake-up frames of a wake-up sequence, and enter into a first idle state for a first idle duration between each of the plurality of receive fragments, the transceiver further comprising transmit circuitry to receive a baseband signal from a digital circuit and process the baseband signal to obtain and transmit second RF signals. The network device may further include the digital circuit coupled to the transceiver, where the digital circuit is to digitize the downconverted signals to digital signals, the digital circuit comprising a signal identification circuit to identify possible presence of the wake-up frame based on a signal fragment of the wake-up frame received during one of the plurality of the receive fragments. The network device may also include at least one functional circuit to perform a function.

In an example: after the receive duration, the receiver circuitry is to enter into a second idle state for a second idle duration, the second idle duration substantially longer than the first idle duration; and in response to the identification of the possible presence of the wake-up frame, the receiver circuitry is to enter into a third idle state for a third idle duration, the third idle duration greater than the first idle duration and less than the second idle duration.

In an example, the at least one functional circuit comprises a sensor to sense at least one environmental condition. In response to detection of another wake-up frame following the identification of the possible presence of the wake-up frame, the network device is to send data regarding the at least one environmental condition to the coordinator device.

In another example, the at least one functional circuit comprises an actuator. The actuator may perform an operation in response to receipt of a request frame from the coordinator device after detection of another wake-up frame following the identification of the possible presence of the wake-up frame.

DETAILED DESCRIPTION

In various embodiments, an Internet of Things (IoT) device or other battery powered wireless device can have receiver circuitry that is controlled to operate on a layered duty cycle basis during low power operation. That is, during a first layer of duty cycling instead of enabling a receiver for a relatively long duration to detect whether a CD is sending a wake-up sequence, another layer of duty cycling may be implemented by searching for a fragment of a wake-up frame within the wake-up sequence. This second layer of duty cycling may search for the fragment anywhere within the frame, including a payload portion of a wake-up frame.

Thus instead of attempting to receive a complete wake-up frame, embodiments may seek to receive a fragment of a wake-up frame. Signal identifier circuitry of the IoT device may, based on a received fragment, determine whether a potential wake-up frame is present. Although embodiments are not limited in this regard, the signal identifier circuitry may identify wake-up frame presence by one or more of modulation and/or spreading characteristics associated with a wake-up frame.

Figure 1A:
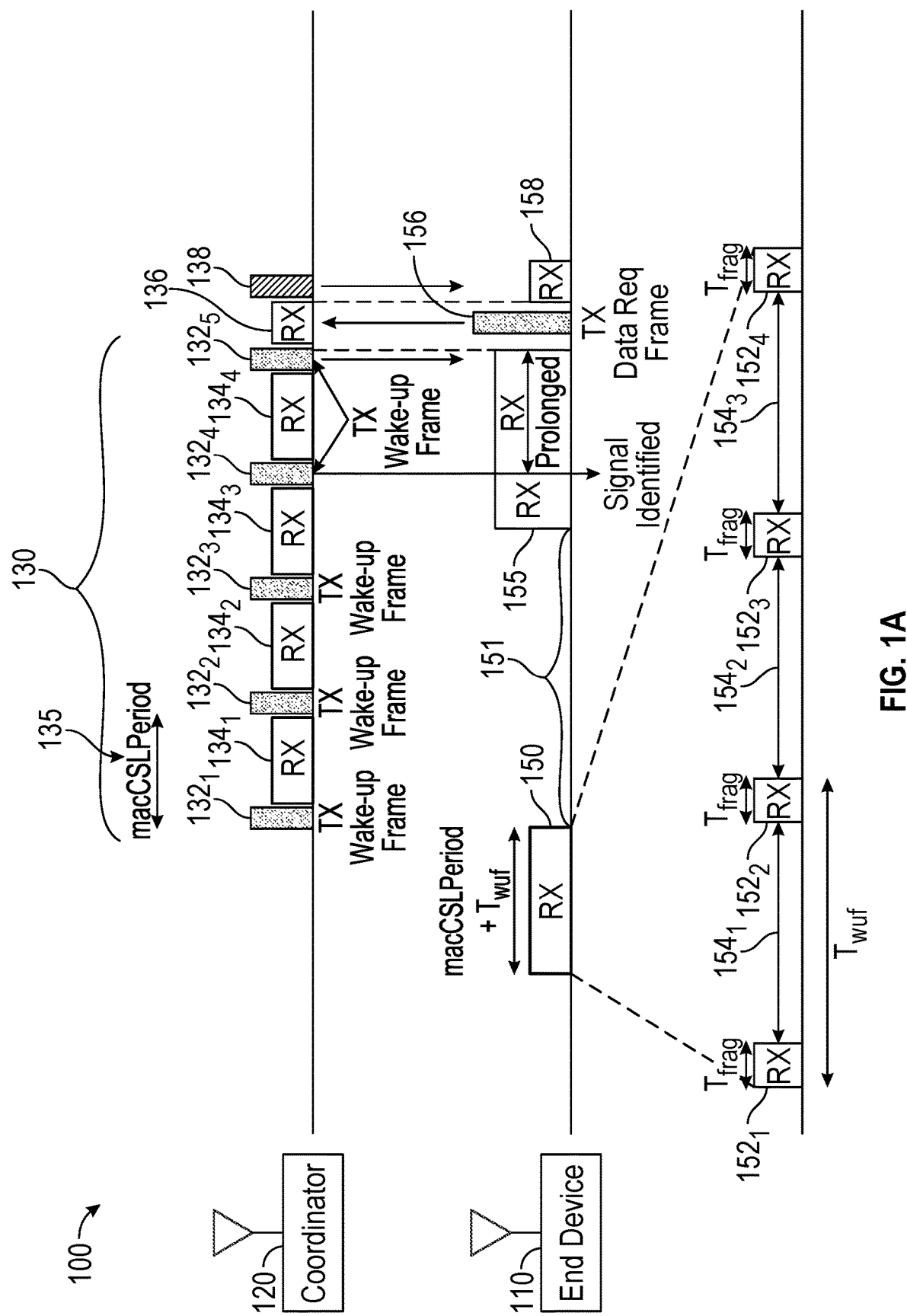
FIGS. 1A-1C are timing diagrams illustrating duty cycled receiver control techniques in accordance with embodiment.

Referring now to FIG. 1A, shown is a timing diagram illustrating a duty cycled receiver control technique in accordance with an embodiment. While in FIG. 1A a duty cycled CSL implementation is shown, understand embodiments are not limited in this regard and the duty cycled receiver control techniques described herein may be used in connection with other communication protocols.

As shown in FIG. 1A, timing diagram 100 illustrates an interaction between two wireless devices, an end device 110 and a coordinator 120. As used herein, the terms "end device" and "network device" are used interchangeably to refer to wireless devices capable of communication within a given wireless network. In typical implementations end device 110 may be a small, e.g., battery-powered IoT device such as a sensor, actuator or so forth. As such, end device 110 may seek to operate in a minimal power state to maintain battery life. With a duty cycled CSL technique as in FIG. 1A, significant current consumption reductions may be realized.

In turn, coordinator 120 may be a non-power constrained or at least less power constrained device. In some embodiments, coordinator 120 may be a master controller of a given network such as a home automation network, sensing network, among other such examples.

As illustrated, coordinator 120 may periodically issue a wake-up sequence 130 having a destination address to wake up a specific device, here, end device 110. As shown, wake-up sequence 130 is formed of a plurality of wake-up frames $132_{1-5}$. After communication of a given wake-up frame 132, coordinator 120 enters into a receive mode $134_1$-$134_4$ (and a subsequent receive mode 136). During these receive modes, coordinator 120 may activate its receiver circuitry to listen to identify an incoming communication from end device 110. Note as used herein, the terms "receive mode" and "receive duration" are used interchangeably to refer to instances in which a receiver is in an active receiving phase.

With further reference to wake-up sequence 130, there is a period 135 between communication of a first wake-up frame $132_1$ and a subsequent wake-up frame $132_2$. This period 135 may be referred to as a "macCSL period" that is formed of a wake-up frame 132 and a corresponding receive duration 134.

In an embodiment for a duty cycled CSL implementation, wake-up frames 132 may have a duration of approximately 0.7 milliseconds (ms) and receive durations 134 may be approximately 70 ms. Of course while described with these parameters for a CSL implementation, other examples are possible. Further, while wake-up sequence 130 is illustrated with five wake-up frames, more or fewer wake-up frames may be communicated in a given wake-up sequence in another implementation.

With reference now to end device 110, assume that its typical operating state is in a low power idle state, as end device 110 may be a field-implemented device operating on battery power that is desired to last for many years. As such, end device 110 may operate in this low power idle state in which relatively minimal amounts of its circuitry is active. However, to be able to receive communications from coordinator 120, end device 110 may periodically enable its receiver circuitry for a receive duration. Specifically as shown in FIG. 1A, end device 110 enables its receiver circuitry for a first receive duration 150 and another receive duration 155. To ensure that a wake-up frame of a wake-up sequence communicated during any part of receive duration 150 may be validly received, receive duration 150 may be configured to have a minimum period that corresponds to the duration of a wake-up frame ($T_{wuf}$) and the macCSLperiod. Without an embodiment, the receiver of the end device would be powered constantly for at least this duration.

As seen in FIG. 1A, since coordinator 120 is not issuing a wake-up sequence during first receive duration 150, end device 110 does not receive anything and thus at a conclusion of receive duration 150, end device 110 enters into an idle state 151 (also referred to herein as a "second idle state"), which may last for a second idle duration. The second idle state may be chosen to be short enough such that when a first wake-up frame of a wake-up sequence is just missed, the last wake-up frame of the wake-up sequence would be received. The duration of the second idle state may be based on knowledge about the wake-up sequence, like the number of wake-up frames per sequence, the macCSLperiod and the duration of a wake-up frame. In an embodiment, this second idle duration may be between approximately 50 ms and 1 second (s).

With embodiments herein, rather than maintaining receiver circuitry enabled for an entire length of receive duration 150, a duty cycled implementation is further illustrated. Thus as shown in FIG. 1A, during receive duration 150, receiver circuitry of end device 110 is enabled only for a small number of receive fragments, namely, receive fragments ($T_{frag}$) 152$_1$-152$_4$, each of which is separated by an idle state 154$_{1-3}$ (also referred to herein as a "first idle state"), which may last for a first idle duration. In an embodiment, this first idle duration may be between approximately 0.1 ms and 1 ms. Note that as shown in FIG. 1A, the time period encompassing first receive fragment 152$_1$, first idle duration 154, and second receive fragment 152$_2$ corresponds to a duration of a wake-up frame, which as mentioned above may be approximately 0.7 ms in an embodiment. Note that a lower power idle state can occur during the second idle state as there is more time available to transition from receive to idle and back to receive, as compared to the first idle state.

For example during the first idle state, disabling the crystal oscillator may not save much energy, if at all, since the crystal oscillator takes time to start up, typically on the order of 100 to 500 microseconds (µs). The longer second idle state may benefit much more from disabling the crystal oscillator as the start-up time is relatively short compared to the second idle state duration. During the first idle state, some circuits in the receiver that can be disabled and enabled quickly may be disabled. In one embodiment such circuitry may include a Low Noise Amplifier (LNA), Local Oscillator driver stages, Programmable Gain Amplifiers (PGAs), Analog-to-Digital Converters (ADCs), digital circuitry, and so forth. In any of the idle states described herein, power consumption could be lowered by one or more of: shutting off supply voltages; shutting off bias currents; gating off digital clock signals; reducing clock frequencies; lowering supply voltages; lowering bias currents, among others.

During such receive fragments, a portion of an incoming signal may be received that can be analyzed by a signal identifier circuit of end device 110. Note that the duration of a receive fragment 152 ($T_{frag}$) may be a fraction of a wake-up frame and may be of a duration that includes a portion of a payload of an incoming wake-up frame. As one example, a duration of receive fragment 152 may be a two symbol detection window plus one symbol transition time (i.e., a total of 3 symbols), when communication is according to an IEEE 802.15.4 standard using an offset quadrature phase-shift keying (OQPSK) PHY.

Still with reference to FIG. 1A, during second receive duration 155, a signal is identified, namely at least a portion of wake-up frame 132$_4$. At the point of this signal identification, receive duration 155 may be prolonged so that end device 110 can detect the next wake-up frame 132$_5$. In response to valid detection of this wake-up frame and at a conclusion of receive duration 155, end device 110 may transmit a frame 156, namely a data request frame. In response to this request, end device 110 receives an incoming data frame 138 from coordinator 120 during another receive duration 158. Understand while shown at this high level in the embodiment of FIG. 1A, many variations and alternatives are possible. For example, end device 110 need not send a data frame request after receipt of a wake-up frame.

Figure 1B:
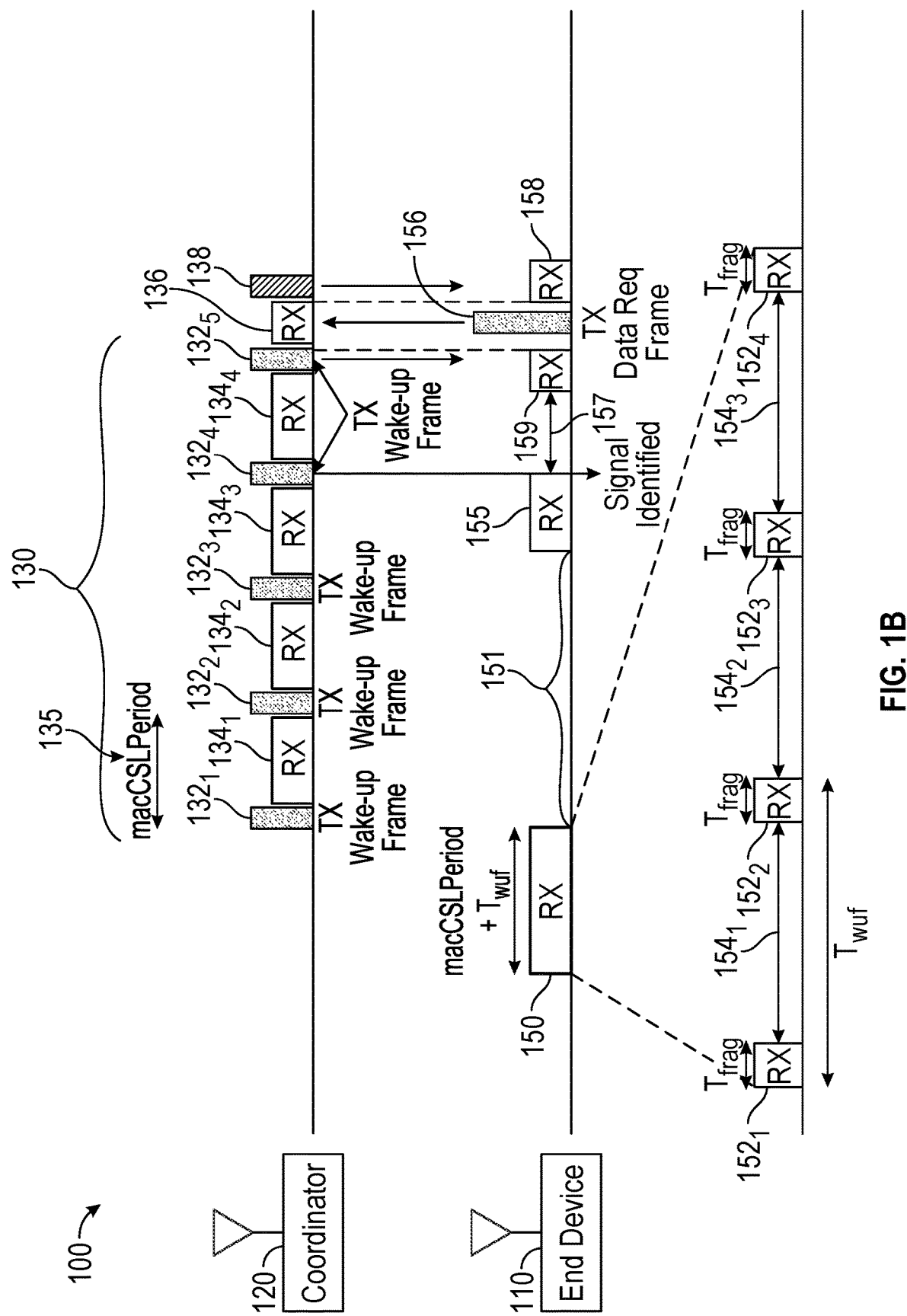

Referring now to FIG. 1B, shown is a timing diagram according to another embodiment. In general, the receiver duty cycle techniques shown in FIG. 1B are the same as in FIG. 1A. However, at the point of identifying a signal during receive duration 155, another idle state 157 for a third idle duration ensues to provide further power saving opportunities. Idle state 157 (also referred to herein as a "third idle state") may last for this third idle duration, which in an embodiment, may be between approximately 1 ms and 1 s.

The embodiment shown in FIG. 1B thus provides an optimization by providing an additional idle state between signal identification and receipt of a next expected wake-up frame.

Thus with consideration of the three different idle states (and durations), the first idle state has the shortest duration, the second idle state has the longest duration, and the third idle state has a duration between the first and second idle durations. In some implementations, the different idle states may be of the same power consumption level (with the same circuitry being powered and not powered in these states). Or greater power savings may be realized in at least the second idle state, as potentially greater amounts of circuitry may be powered down in the longer second idle duration of this idle state. With embodiments, idle current consumption may be reduced from approximately 300 microamperes (µA) when a receiver is enabled for a complete receive duration to approximately 40 µA when the receiver is enabled to enter the first idle state following each receive fragment. Understand that as used herein, the term "low power idle state" refers to a state in which transceiver circuitry consumes a minimum amount of power. In contrast in at least the first and third, and potentially second, idle states described herein, there may be more parts in the transceiver circuitry that consume power, and thus overall power consumption of the transceiver circuitry in these idle states may be greater than when in a low power idle state.

Depending upon a desired power consumption budget for a given end device, the end device may be configured to operate either according to the duty cycled operation of FIG. 1A or that of FIG. 1B. With further reference to FIG. 1B, at a conclusion of third idle state 157, another receive duration 159 may occur in which wake-up frame 132$_5$ is received. In other aspects, the operation in FIG. 1B is the same as that of FIG. 1A.

Referring now to FIG. 10, shown is a timing diagram of yet another embodiment. In FIG. 10, illustrated is a post processing technique in which end device 110 may store any signal information received during its receive durations in a buffer or other memory. Thereafter, end device 110 may perform post processing to identify presence (or not) of a possible wake-up frame. In such embodiment, signal identifier circuitry may be active after receiving a receive fragment, and receiver circuitry may be in an idle state during post processing.

Figure 1C:
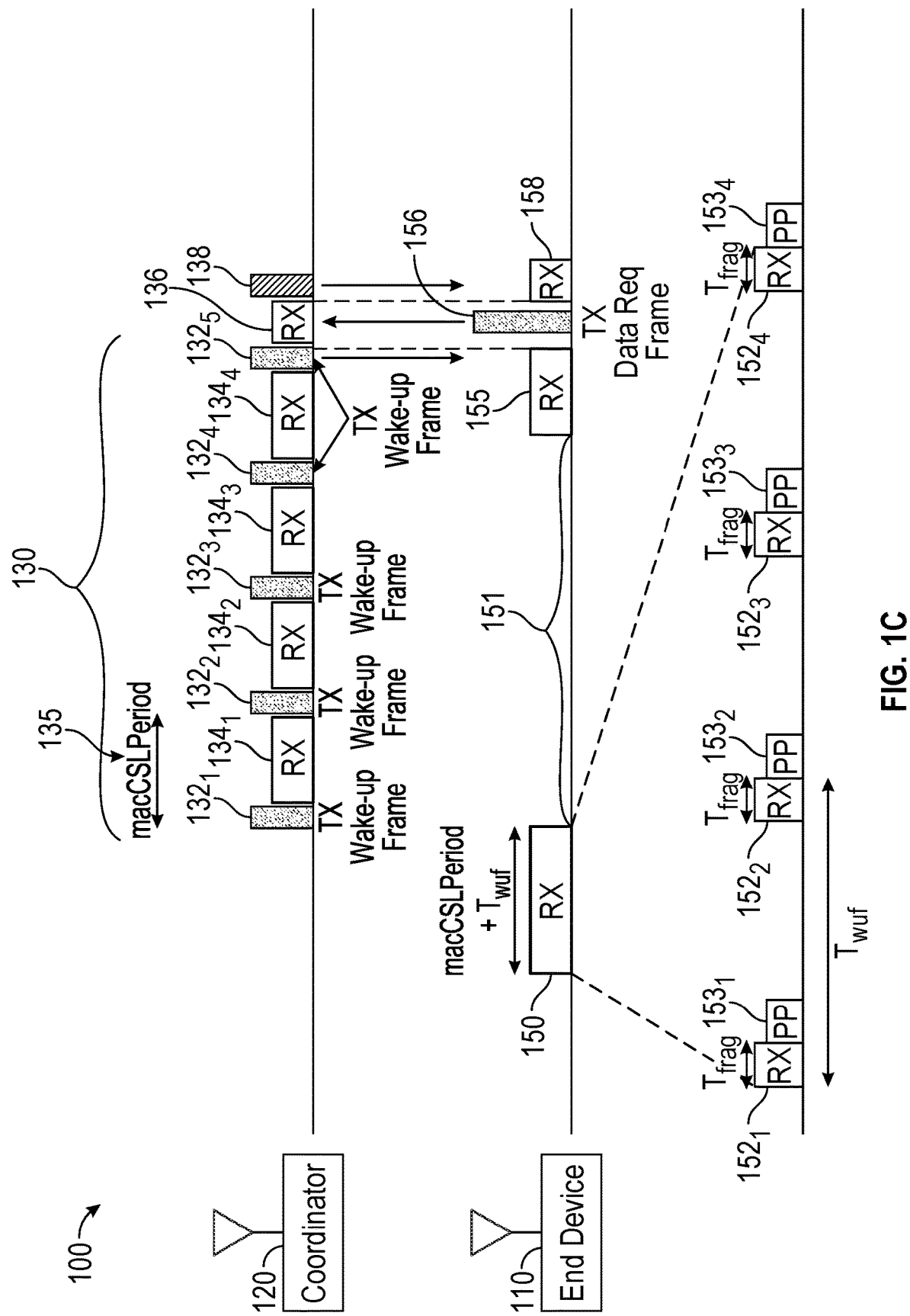

Thus as illustrated in FIG. 1C, during receive duration 150, after each receive duration 152, a post processing period 153$_{1-4}$ occurs in which digital circuitry of end device 120 may obtain signal information from the buffer or other memory and process any received information to identify presence of a possible wake-up frame. In other aspects, the duty cycled operation shown in FIG. 1C is similar to that in FIGS. 1A and 1B.

Figure 2:
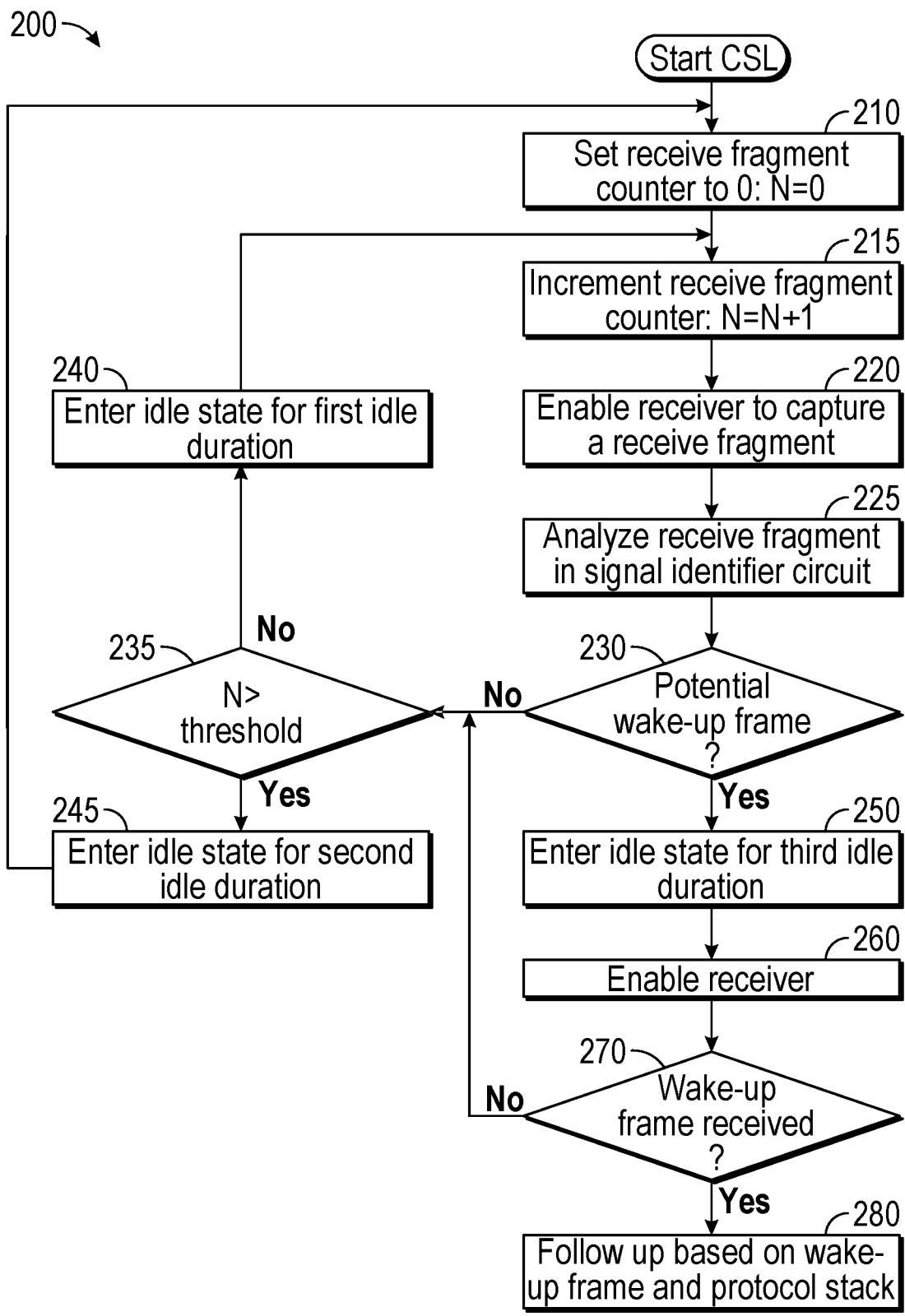
FIG. 2 is a flow diagram of a method in accordance with an embodiment.

Referring now to FIG. 2, shown is a flow diagram of a method in accordance with an embodiment. Method 200 is a method for performing duty cycled receiver techniques as described herein, and as such, may be performed by circuitry of an end device, which may include hardware control circuitry such as a controller to control a receiver along with digital portions of the end device, and which may execute firmware and/or software.

As shown in FIG. 2, method 200 begins on entry to CSL operation by setting a receive fragment counter to an initial value (e.g., zero) (block 210). Next at block 215 this receive fragment counter is incremented (e.g., by one).

Still with reference to FIG. 2, at block 220, the receiver may be enabled to operate for a receive duration is a duty cycled receive duration, as described herein. As such at block 220 the receiver is enabled to capture a receive fragment. The loop formed by blocks 215, 220, 225, 230, 235 and 240 performs the duty cycled sampled listening. With reference back to FIG. 1A, this duty cycled sampled listening may occur during receive duration 150. As discussed above, this duty cycled sampled listening may occur so that a receiver is iteratively enabled and disabled for small fragments of the receive duration to realize power savings.

Next control passes to block 225, where a signal identifier circuit of the end device may analyze any signal information present within the receive fragment. Based on such processing, the signal identifier circuit may determine, at diamond 230, whether a potential wake-up frame was received. This determination may be based on identifying received energy above a threshold, detection of modulation characteristics associated with the wake-up frame, detection of spreading characteristics associated with the wake-up frame, or a combination thereof.

If the determination is that there is no potential wake-up frame, control passes to diamond 235 where it is determined whether the receive fragment counter exceeds a threshold. If not, the receiver is controlled to enter an idle state for a first idle duration (block 240). Note that this idle state may be for a relatively short time duration, namely for the macCSL period plus the duration of a wake-up frame. Thereafter, control passes back to block 215.

If instead the receive fragment counter exceeds the threshold, control passes to block 245 where the receiver may be placed into an idle state for a second idle duration. With reference back to FIG. 1A, this second idle duration may correspond to a relatively long period of time in which a receiver is disabled, as a duty cycled receive duration has completed.

Still with reference to FIG. 2, if instead a potential wake-up frame is identified at diamond 230, control passes to block 250 where the receiver may enter an idle state for a third idle duration. This block may be optional in certain implementations, such as that shown in FIG. 1B. In any event next at block 260, the receiver may be enabled and at diamond 270, it can be determined whether a wake-up frame is received and detected. This detection at diamond 270 may be distinguished from the determination of a potential wake-up frame at diamond 230, in that at diamond 270, an actual wake-up frame may be received and processed, e.g., fully decoded, to identify information in a preamble, sync word, PHY header and a payload of the frame.

If no wake-up frame is detected, control passes back to diamond 235 discussed above, and then entry into either the first or second idle duration. Otherwise, when a wake-up frame is received, control passes to block 280 where various operations may occur. Specially, based on information embedded in the wake-up frame and/or protocol stack, some function may be performed.

As one example in a coordinator/end device implementation, the end device may send a data request frame. In another example, a wake-up frame may include a Rendezvous Time Information Element (IE) that has a time field containing a value that represents the expected time between the end of transmission of the wake-up frame and the beginning of the transmission of a data frame. Understand while shown at this high level in the embodiment of FIG. 2, many variations and alternatives are possible.

For example, embodiments are not limited to CSL implementations or end device-coordinator device interactions. In other implementations, a battery operated remote control device may be in communication with a device it controls, e.g., a battery operated end device (e.g., an LED light, a shade motor, door lock, etc.). In this application the remote does not need to synchronize and it can mostly sleep, even without maintaining a timer. In this way, the sleep current could be really low. After transmission of the wake-up sequence by the remote control device, a single data frame may be used to control one or multiple end devices simultaneously.

Figure 3:
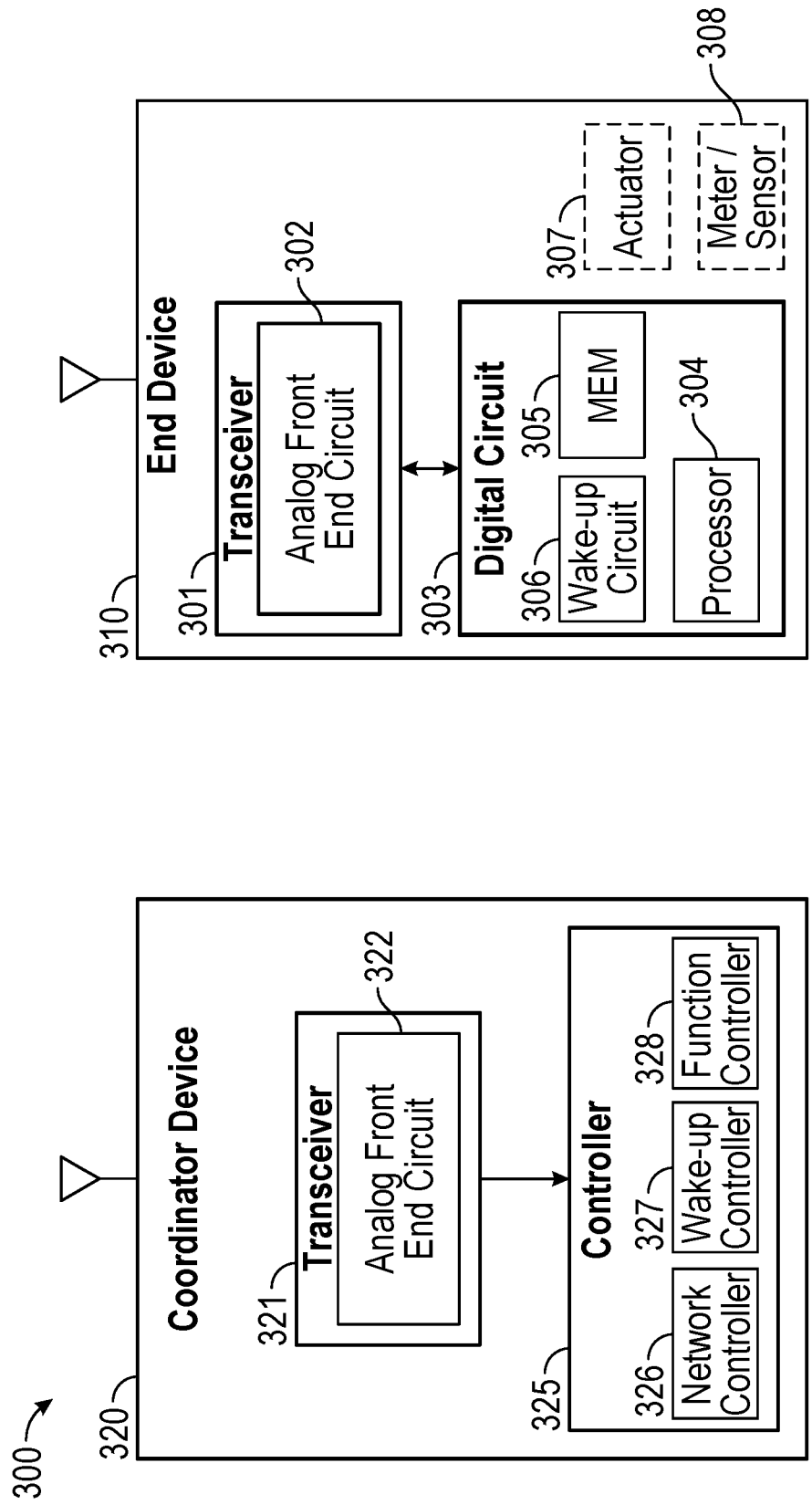
FIG. 3 is a block diagram of a network environment in accordance with an embodiment.

Referring now to FIG. 3, shown is a block diagram of a network environment in accordance with an embodiment. As shown in FIG. 3, a network environment includes an end device 310 and a coordinator device 320. As one example, network environment 300 may be a home automation network in which coordinator device 320 is a master controller of the network, and end device 310 is one representative end node of, e.g., a mesh network. For example, end device 310 may have an actuator for an automated shade, a sensor such as a temperature sensor or so forth. Understand that while shown with these two single devices, many more end devices or other network devices may be present. In a given implementation, end device 310 may couple to coordinator device 320 by one or more intervening network devices within network environment 300.

Starting first with end device 310, included is a transceiver 301, itself including an analog front end circuit 302. Understand that transceiver 301 may include receiver circuitry and transmit circuitry, some of which may be shared by the transmit and receive paths. In a transmit direction, transceiver 301 may include one or more gain stages, filtering circuitry, upconversion circuitry and a power amplifier to receive and upconvert a baseband signal to an RF signal to be transmitted. In a receive direction, transceiver 301 may include one or more gain stages including a low noise amplifier, filtering circuitry, downconversion circuitry and so forth to receive and process an incoming RF signal and provide it to analog front end circuit 302, which may further process it and provide a baseband signal to a digital circuit 303. Digital circuit 303 may include an analog-to-digital converter to receive analog signal information from transceiver 301 and convert it into digital form for further processing within digital circuit 303.

As shown, digital circuit 303 includes a processor 304, a memory 305 and a wake-up circuit 306. In embodiments herein, wake-up circuit 306 may be implemented as a microcontroller, finite state machine or so forth to perform duty cycled receive control techniques as described herein. To this end, wake-up circuit 306 may include or be coupled to a non-transitory storage medium that can store instructions and data. Such non-volatile storage may store instructions, including instructions for performing duty cycled receive control techniques, as described herein. In addition, the non-volatile storage can store configuration data regarding idle durations and number of receive fragments, as described herein. Wake-up circuit 306 may also include the signal identification circuit. Processor 304 may be a main processor of end device 310. Memory 305 may, in some cases, provide buffer storage for incoming sample information of signal fragments that can be post processed, e.g., by processor 304 as described herein. In other embodiments, processor 304 may process some or all of the tasks associated with wake-up circuit 306, thereby replacing part or all of the wake-up circuitry.

Still with reference to FIG. 3, coordinator device 320 may be somewhat similarly arranged with a transceiver 321 including an analog front end circuit 322. As further shown, coordinator device 320 includes a controller 325. In embodiments, controller 325 may be implemented as a main processor of coordinator device 320, and may include a network controller 326, a wake-up controller 327 and a function controller 328. Network controller 326 may perform control operations for network environment 300 including controlling communications within network environment 300 as well as to one or more external locations, such as a remote entity. Wake-up controller 327 may be configured, e.g., in a CSL mode to send wake-up sequences to one or more end devices including end device 310 as described herein. As further shown, function controller 328 may be configured to control functional operation of one or more end devices including end device 310. Understand while shown at this high level in the embodiment of FIG. 3, many variations and alternatives are possible.

Note that transmission of wake-up sequences is not restricted to the coordinator device, e.g., an end device may also have this capability. For example, one end device may wake-up another end device in a mesh network. In addition a remote or sensor device may also transmit a wake-up sequence in response to remote control activity or sensor activation Also, duty cycled listening is not restricted to the end device. The coordinator device may also perform the duty cycled listening as described herein, to conserve energy or prolong battery life.

Figure 4:
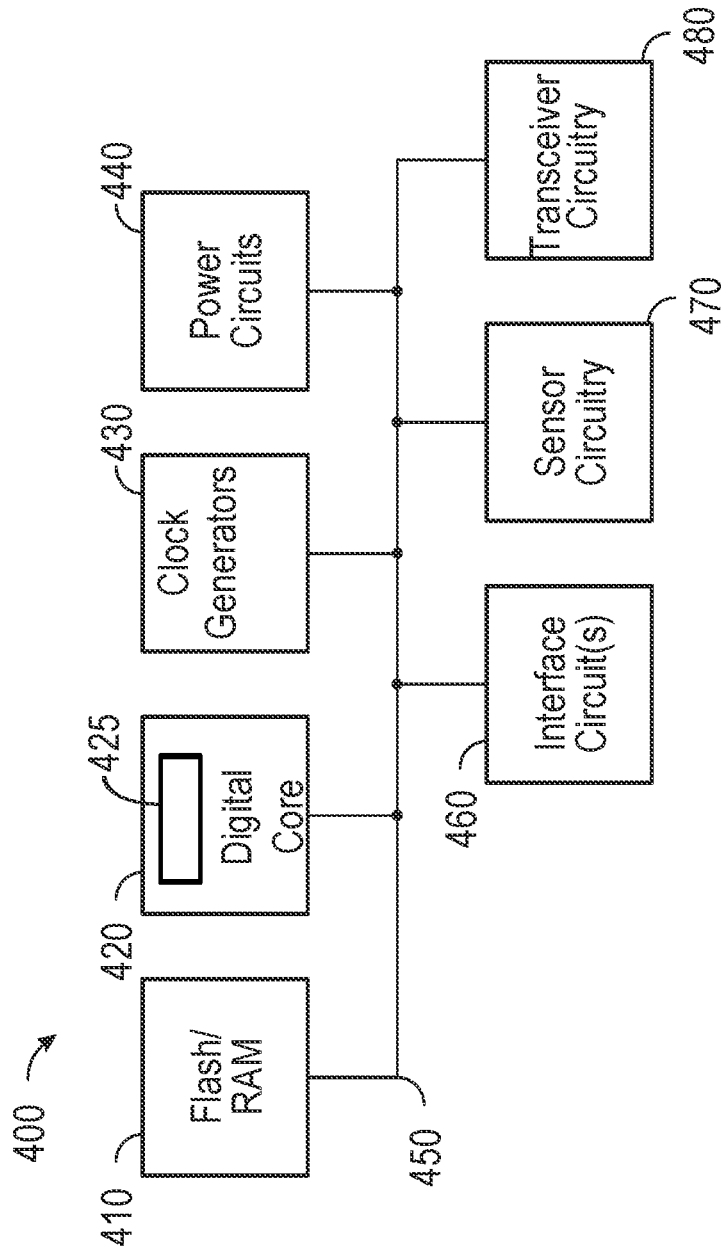
FIG. 4 is a block diagram of a representative integrated circuit that incorporates an embodiment.

Referring now to FIG. 4, shown is a block diagram of a representative integrated circuit 400 that includes wake-up circuitry as described herein. In the embodiment shown in FIG. 4, integrated circuit 400 may be, e.g., a microcontroller, wireless transceiver that may operate according to one or more wireless protocols (e.g., WLAN-OFDM, WLAN-DSSS, Bluetooth, among others), or other device that can be used in a variety of use cases, including sensing, metering, monitoring, embedded applications, communications, applications and so forth, and which may be particularly adapted for use in an IoT device.

In the embodiment shown, integrated circuit 400 includes a memory system 410 which in an embodiment may include a non-volatile memory such as a flash memory and volatile storage, such as RAM. In an embodiment, this non-volatile memory may be implemented as a non-transitory storage medium that can store instructions and data. Such non-volatile memory may store instructions, including instructions for performing duty cycled listening as described herein.

Memory system 410 couples via a bus 450 to a digital core 420, which may include one or more cores and/or microcontrollers that act as a main processing unit of the integrated circuit. As shown digital core 420 includes a wake-up circuit 425 configured to perform duty cycled listening as described herein. In turn, digital core 420 may couple to clock generators 430 which may provide one or more phase locked loops or other clock generator circuitry to generate various clocks for use by circuitry of the IC.

As further illustrated, IC 400 further includes power circuitry 440, which may include one or more voltage regulators. Additional circuitry may optionally be present depending on particular implementation to provide various functionality and interaction with external devices. Such circuitry may include interface circuitry 460 which may provide interface with various off-chip devices, sensor circuitry 470 which may include various on-chip sensors including digital and analog sensors to sense desired signals, such as for a metering application or so forth.

In addition as shown in FIG. 4, transceiver circuitry 480 may be provided to enable transmission and receipt of wireless signals, e.g., according to one or more of a local area or wide area wireless communication scheme, such as Zigbee, Bluetooth, IEEE 802.11, IEEE 802.15.4, cellular communication or so forth. Understand while shown with this high level view, many variations and alternatives are possible.

Note that ICs such as described herein may be implemented in a variety of different devices such as an IoT device. This IoT device may be, as two examples, an IoT device of a home or industrial automation network or a smart utility meter for use in a smart utility network, e.g., a mesh network in which communication is according to an IEEE 802.15.4 specification or other such wireless protocol.

Figure 5:
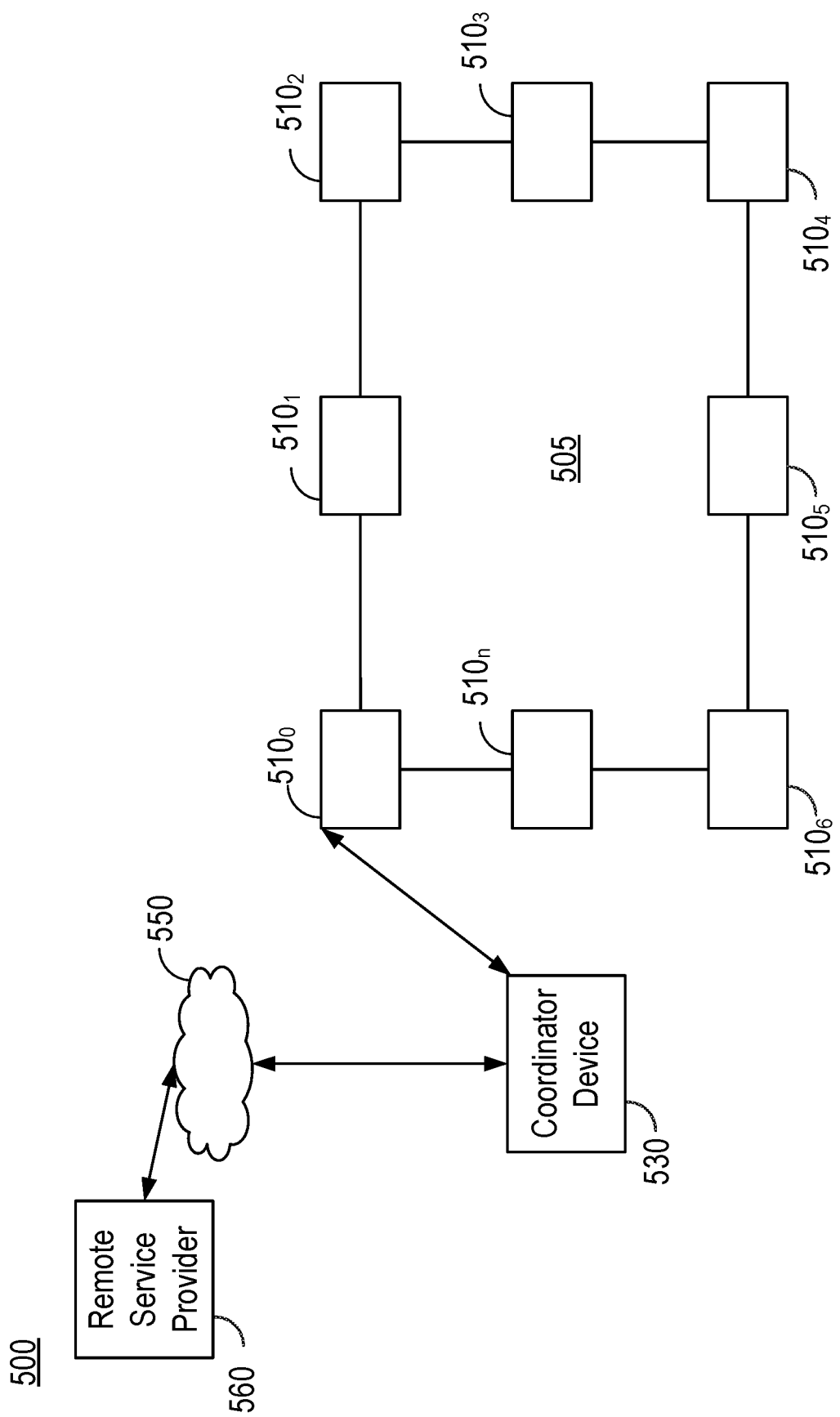
FIG. 5 is a high level diagram of a network in accordance with an embodiment.

Referring now to FIG. 5, shown is a high level diagram of a network in accordance with an embodiment. As shown in FIG. 5, a network 500 includes a variety of devices, including smart devices such as IoT devices, coordinator devices and remote service providers. In the embodiment of FIG. 5, a mesh network 505 may be present, e.g., in a building having multiple IoT devices $510_{0-n}$. Such IoT devices may perform duty cycled listening as described herein. As shown, at least one IoT device 510 couples to a coordinator device 530 that in turn communicates with a remote service provider 560 via a wide area network 550, e.g., the internet. Coordinator device 530 may be configured to send periodic wake-up sequences to cause a wake up of a given IoT device 510, which may detect at least a fragment of a wake-up frame using a duty cycled listening technique as described herein. In an embodiment, remote service provider 560 may be a backend server of a utility that handles communication with IoT devices 510. Understand while shown at this high level in the embodiment of FIG. 5, many variations and alternatives are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
 a receiver to receive and process radio frequency (RF) signals to obtain downconverted signals;
 a digitizer coupled to the receiver to digitize the downconverted signals to digital signals; and
 a controller to enable the receiver for a plurality of receive fragments during a listening period, each of the plurality of receive fragments having a duration that is a fractional duration of a wake-up frame, and to cause the receiver to:
 enter into a first idle state for a first idle duration between each of the plurality of receive fragments; and
 enter into a second idle state for a second idle duration after the listening period, the second idle duration longer than the first idle duration.

2. The apparatus of claim 1, wherein the controller is to cause the receiver to enter into a third idle state after detection of a portion of a wake-up frame during one of the plurality of fragments, the third idle state for a third idle duration.

3. The apparatus of claim 1, further comprising a memory to store configuration information comprising a first value of the first idle duration, wherein the controller is to obtain the first value from the memory and enable the receiver to enter the first idle state for the first idle duration according to the first value.

4. The apparatus of claim 1, further comprising a signal identifier circuit coupled to the digitizer to receive the digital signals and to identify a possible wake-up frame in response to the digital signals.

5. The apparatus of claim 4, wherein the signal identifier circuit is to identify the possible wake-up frame according to one of received energy during the signal fragment, modulation characteristics associated with the wake-up frame, or spreading characteristics associated with the wake-up frame.

6. A system comprising:
a network device comprising:
a transceiver comprising receiver circuitry to receive and process first radio frequency (RF) signals to obtain downconverted signals, wherein when the network device is in a low power idle state, the receiver circuitry is to enter into an active state for a plurality of receive fragments of a receive duration, the receive duration formed of a duration of two wake-up frames of a wake-up sequence, and enter into a first idle state for a first idle duration between each of the plurality of receive fragments, the transceiver further comprising transmit circuitry to receive a baseband signal from a digital circuit and process the baseband signal to obtain and transmit second RF signals;
the digital circuit coupled to the transceiver, the digital circuit to digitize the downconverted signals to digital signals, the digital circuit comprising a signal identification circuit to identify possible presence of the wake-up frame based on a signal fragment of the wake-up frame received during one of the plurality of the receive fragments; and
at least one functional circuit to perform a function.

7. The system of claim 6, wherein:
after the receive duration, the receiver circuitry is to enter into a second idle state for a second idle duration, the second idle duration substantially longer than the first idle duration; and
in response to the identification of the possible presence of the wake-up frame, the receiver circuitry is to enter into a third idle state for a third idle duration, the third idle duration greater than the first idle duration and less than the second idle duration.

8. The system of claim 6, wherein the at least one functional circuit comprises a sensor to sense at least one environmental condition, wherein in response to detection of another wake-up frame following the identification of the possible presence of the wake-up frame, the network device is to send data regarding the at least one environmental condition to another device.

9. The system of claim 6, wherein the at least one functional circuit comprises an actuator, wherein the actuator is to perform an operation in response to receipt of a request frame from another device after detection of another wake-up frame following the identification of the possible presence of the wake-up frame.

* * * * *